US009080918B2

(12) United States Patent
Fishel et al.

(10) Patent No.: US 9,080,918 B2
(45) Date of Patent: Jul. 14, 2015

(54) COMPLIANT TACTILE SENSOR WITH FLUID-FILLED, SPONGE-LIKE MATERIAL

(71) Applicant: SynTouch, LLC, Los Angeles, CA (US)

(72) Inventors: Jeremy A. Fishel, Fullerton, CA (US); Gerald E. Loeb, South Pasadena, CA (US); Raymond A. Peck, Los Angeles, CA (US); Chia-Hsien Lin, Los Angeles, CA (US); Blaine Matulevich, Kalispell, MT (US); Vikram Pandit, Irvine, CA (US)

(73) Assignee: SynTouch LLC, Los Angeles, CA (US)

( * ) Notice: Subject to any disclaimer, the term of this patent is extended or adjusted under 35 U.S.C. 154(b) by 123 days.

(21) Appl. No.: 14/021,906

(22) Filed: Sep. 9, 2013

(65) Prior Publication Data

US 2014/0069212 A1    Mar. 13, 2014

Related U.S. Application Data

(60) Provisional application No. 61/699,561, filed on Sep. 11, 2012, provisional application No. 61/814,392, filed on Apr. 22, 2013.

(51) Int. Cl.
*G01L 1/02* (2006.01)
*G01L 5/22* (2006.01)

(52) U.S. Cl.
CPC .. *G01L 1/02* (2013.01); *G01L 5/228* (2013.01)

(58) Field of Classification Search
CPC .......... B25J 13/084; G01L 5/228; G01L 1/02; G01L 5/28
USPC .............................. 73/760, 763, 820, 862.581
See application file for complete search history.

(56) References Cited

U.S. PATENT DOCUMENTS

| 4,306,148 | A | 12/1981 | Ringwall et al. |
| 6,501,463 | B1 | 12/2002 | Dahley et al. |
| 7,658,119 | B2 | 2/2010 | Loeb et al. |

(Continued)

FOREIGN PATENT DOCUMENTS

WO        01/70541 A1       9/2001

OTHER PUBLICATIONS

Armendariz, J. et al. 2012. Improving physical human-robot interaction through viscoelastic soft fingertips. In Proc. IEEE Intl. Conf. Intelligent Robots and Systems, 2012, pp. 2977-2984.

(Continued)

*Primary Examiner* — Max Noori
(74) *Attorney, Agent, or Firm* — McDermott Will & Emery LLP

(57) ABSTRACT

A compliant tactile sensor may include sponge-like material, a flexible skin, and a fluid pressure sensor. The flexible skin may have a shape, absorb fluid, compress in response to force applied to the sponge-like material, and decompress and return to its original shape when the force is removed. The flexible skin may cover an outer surface of the sponge-like material. The fluid pressure sensor may sense changes in pressure in fluid that is within the sponge-like material caused by a force applied to the flexible skin. A robotic system may include a movable robotic arm, a compliant tactile sensor on the movable robotic arm that senses contact between the compliant tactile sensor and an object during movement of the movable robotic arm and that cushions the effect of that contact, and a reflex system that causes the moveable robotic arm to move in response to commands.

24 Claims, 7 Drawing Sheets

(56) References Cited

U.S. PATENT DOCUMENTS

| | | | |
|---|---|---|---|
| 7,878,075 | B2 | 2/2011 | Johansson et al. |
| 8,181,540 | B2 | 5/2012 | Loeb et al. |
| 8,401,658 | B2 | 3/2013 | Woods et al. |
| 2008/0106258 | A1* | 5/2008 | Torres-Jara ............... 324/207.2 |
| 2009/0031825 | A1 | 2/2009 | Kishida et al. |
| 2009/0133508 | A1* | 5/2009 | Johansson et al. ....... 73/862.046 |
| 2010/0049450 | A1* | 2/2010 | Nagakubo et al. .............. 702/41 |
| 2011/0190805 | A1* | 8/2011 | Huber .......................... 606/191 |
| 2012/0098789 | A1 | 4/2012 | Ciesla et al. |

OTHER PUBLICATIONS

Beck, S. et al. 2003. Model-based control and object contact detection for a fluidic actuated robotic hand. In Proc. IEEE International Conference on Decision and Control, 2003, pp. 6369-6374.

Biagotti, L. et al. 2003. Mechatronic design of innovative fingers for anthropomorphic robot hands. In Proc. IEEE Intl. Conf. Robotics and Automation, 2003, pp. 3187-3192.

Ceres. R. et al. 1998. Design and implementation of an aided fruit-harvesting robot (Agribot), Industrial Robot: An International Journal, MCB UP Ltd, 1998, 25(5): 337-346.

Dahiya, R.S. et al. 2010. Tactile sensing—from humans to humanoids. IEEE Trans Robotics, 2010, 26(1): 1-20.

Engeberg, E.D. et al. 2008. Improved grasp force sensitivity for prosthetic hands through force-derivative feedback. IEEE Trans Biomedical Engineering, 2008, 55(2): 817-821.

Fishel, J.A. et al. 2008. A robust micro-vibration sensor for biomimetic fingertips. In Proc. IEEE Intl Conf Biomed Robotics and Biomechatronics, 2008, pp. 659-663.

Fishel, J.A. et al. 2012. Bayesian exploration for intelligent identification of textures. Front. Neurorobot. 6(4): 1-20.

Fishel, J.A. et al. 2012. Sensing tactile microvibrations with the BioTac—Comparison with human sensitivity. In Proc. IEEE Intl Conf Biomed Robotics and Biomechatronics, 2012, pp. 1122-1127.

Heyneman, B. et al. 2012. Biologically inspired tactile classification of object-hand and object-world interactions. In Proc. IEEE Intl Conf on Robotics and Biomimetics, 2012, pp. 167-173.

Howe, R.D. 1994. Tactile sensing and control of robotic manipulation. Adv. Robotics. 1994;8(3):245-261.

Johansson, R.S., et al. 1984. Roles of glabrous skin receptors and sensorimotor memory in automatic control of precision grip when lifting rougher or more slippery objects. Exp Brain Res. 1984, 56:550-564.

Johansson, R.E., et al. 1987. Signals in tactile afferents from the fingers eliciting adaptive motor responses during precision grip. Exp Brain Res. 1987, 66:141-154.

Johansson, R.S. et al. 2004. First spikes in ensembles of human tactile afferents code complex spatial fingertip events. Nat Neurosci. 2004, 7(2):170-177.

Johansson, R.S. et al. 2009. Coding and use of tactile signals from the fingertips in object manipulation tasks. Nat Rev Neurosci. 2009, 10:345-359.

Khurshid, A. et al. 2011. Robotic Grasping and Fine Manipulation Using Soft Fingertip. Advances in Mechatronics; 2011, 7:155-175.

Kim, S. et al. 2008. Inflatable mouse: volume-adjustable mouse with air-pressure-sensitive input and haptic feedback. In Proc of SIGCHI Conf on Human Factors in Computing Systems, ACM, 2008, pp. 211-224.

Kyberd, P.J. et al. 1994. The Southampton Hand: an intelligent myoelectric prosthesis. JRRD. 1994, (4):326-334.

Lee, M.H. et al. 1999. Tactile sensing for mechatronics—a state of the art survey. Mechatronics. 1999, 9:1-31.

Lin, C.H. et al. 2009. Signal processing and fabrication of a biomimetic tactile sensor array with thermal, force and microvibration modalities. In Proc. IEEE Intl Conf on Robotics and Biomimetics, 2009, pp. 129-134.

Matulevich, B. et al. 2013.Utility of contact detection and compliant fingertips in prosthetic hand control. In Proc. IEEE Intl. Conf. Intelligent Robots and Systems, 2013, pp. 4741-4746.

Nicholls, H.R. et al. 1989. A survey of robot tactile sensing technology, International Journal of Robotics Research, 1989, 8(3): 3-30.

Pylatiuk, C. et al. 2004. Progress in the development of a multifunctional hand prosthesis. IEEE Engineering in Medicine and Biology Society, pp. 4260-4263.

Sears, H.H. et al. 1991. Proportional myoelectric hand control: an evaluation. Am J Phys Med Rehabil. 70(1): 20-28, Feb. 1991.

Shinoda, H. et al. 1993. A tactile sensor using three-dimensional structure. In Proc. IEEE Intl Conf on Robotics and Automation, 1993, pp. 435-441.

Su, Z. et al. 2012. Use of tactile feedback to control exploratory movements to characterize object compliance. Front. Neurorobot. 6(7): 1-9.

Westling, G. et al. 1984. Factors influencing the force control during precision grip. Exp Brain Res. 1984, 53:77-284.

Wettels, N. et al. 2008. Biomimetic tactile sensor array. Adv. Robotics. 2008, 22(7): 829-849.

Wettels, N. et al. 2008. Deformable skin design to enhance response of a biomimetic tactile sensor. In Proc. IEEE Intl Conf Biomed Robotics and Biomechatronics. 2008, pp. 132-137.

Wettels, N. et al. 2011. Haptic feature extraction from a biomimetic tactile sensor: force, contact location and curvature. In Proc. IEEE Intl Conf on Robotics and Biomimetics. 2011, pp. 2471-2478.

Xu, D. et al. 2013. Tactile identification of objects using Bayesian exploration. In Proc. IEEE International Conference on Robotics and Automation, pp. 3056-3061.

ISA/European Patent Office. 2014. International Search Report and Written Opinion of the International Searching Authority, dated Feb. 3, 2014, for corresponding PCT Application PCT/US2013/058809, entitled "Compliant Tactile Sensor with Fluid-Filled, Sponge-Like Material," filed Sep. 9, 2013.

\* cited by examiner

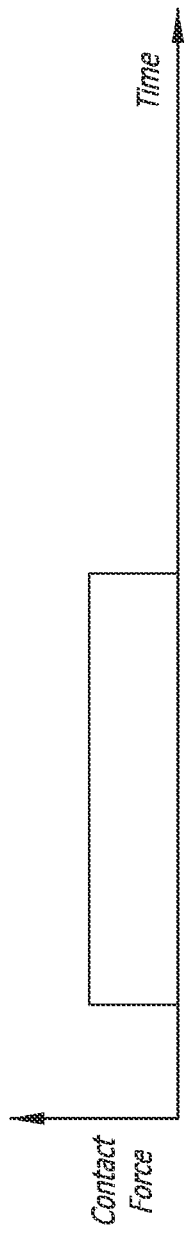
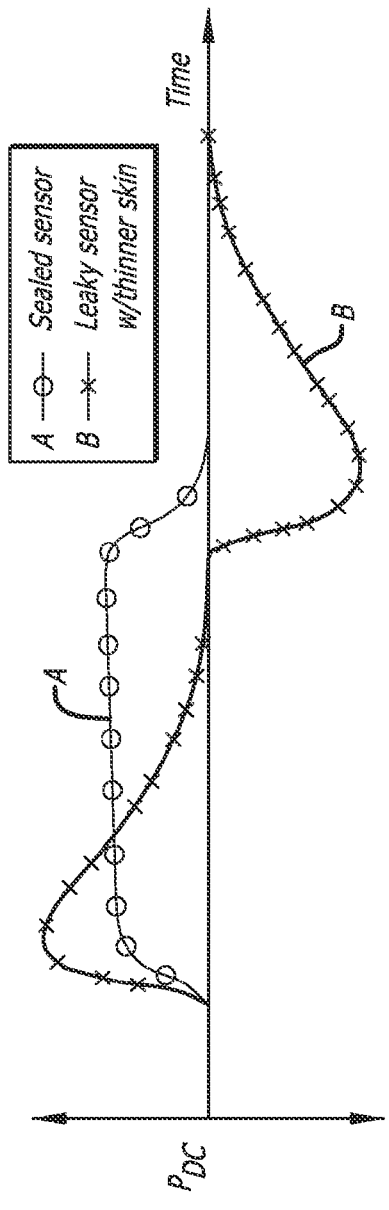
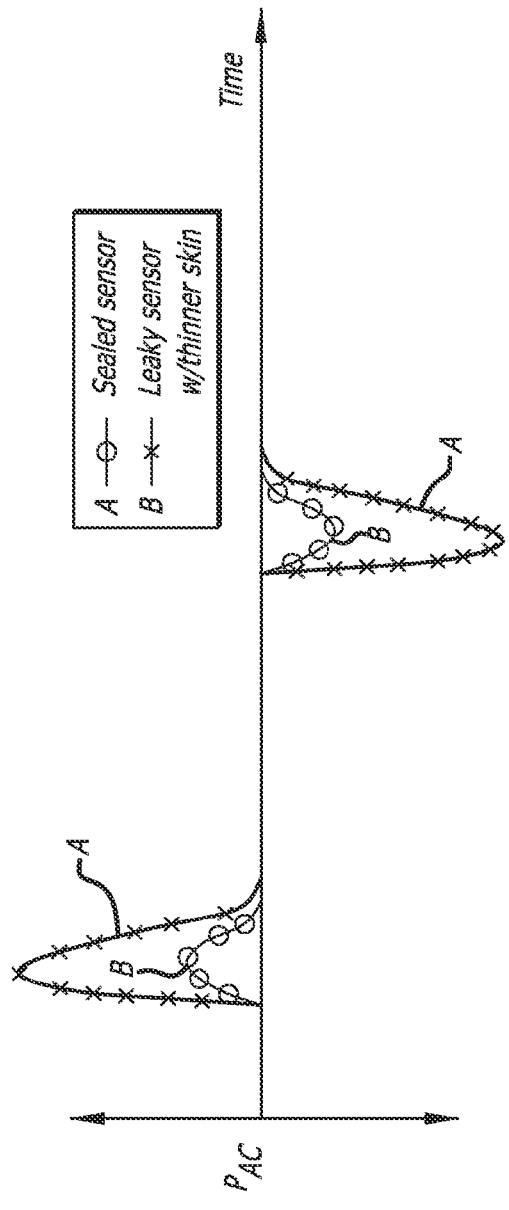
FIG. 5A
FIG. 5B
FIG. 5C

COMPLIANT TACTILE SENSOR WITH FLUID-FILLED, SPONGE-LIKE MATERIAL

CROSS-REFERENCE TO RELATED APPLICATIONS

This application is based upon and claims priority to U.S. provisional patent applications 61/699,561, entitled "Pneumatic Tactile Sensor for Contact Detection and Grasp Stability," filed Sep. 11, 2012, and 61/814,392, entitled "Fluid-Filled Tactile Sensor Incorporating Elastomeric Foam," filed Apr. 22, 2013. The entire content of each of these applications is incorporated herein by reference.

STATEMENT REGARDING FEDERALLY SPONSORED RESEARCH

This invention was made with government support under Grant No. 5R44HD061165-03 awarded by National Institutes of Health and Grant No. IIP-1142277 awarded by the National Science Foundation. The government has certain rights in the invention.

BACKGROUND

1. Technical Field

This disclosure relates to robotics and prosthetic limbs, including fingertips.

2. Description of Related Art

Robots may be unable to carry on a broad array of important delicate tasks, such as assembly operations, handling fragile objects, and preventing damage in accidental collisions. Prosthetics may similarly be unable to carry on a broad array of important delicate tasks.

Robotic systems may include a rigid set of links with actuated degrees of freedom that are controlled with electric motors. The position, velocity, and/or force at these degrees of freedom (or, in the case of rotating joints, angle, angular velocity, and/or torque) may be controlled by a high-level controller coordinating the movement of each of the joints. The controller may run completely autonomously or be controlled manually in whole or in part by a human operator, as in the case of telerobotics.

Such robotic systems may physically interact with their environment. The high-level controller may obtain knowledge about its environment and respond to both expected and unexpected events. In the case of autonomous systems, machine vision may be employed to identify the location and orientation of objects and precision equipment may direct the robot to a desired location. However, algorithms for machine vision may be slow and prone to errors when vision is obstructed, surfaces are out of view, or there are shadows or is poor contrast.

In telerobotic systems, a human operator may interpret images from a video camera or observe the robot directly and may attempt to adjust his or her commands to the robot as rapidly and precisely as possible. However, this mental concentration may be exhausting to the operator and reaction time may be slow.

Fast-reacting systems may require precise robotics employing stiff mechanical linkages, high-quality position and force encoders, high-speed feedback controllers, and powerful and heavy motors. However, these components can be costly. High impact forces from unexpected collisions with objects in the environment can also be catastrophic to either the robot or the object (including humans who may be in the workspace).

DC motors may drive industrial robotic hands or myoelectric prosthetic hands. The closing speed of an unloaded hand may be directly proportional to the voltage across the motors. In prosthetic applications, this control voltage may be generated from amplified and filtered electromyography recordings of a prosthesis user's residual muscles to produce a voltage in proportion to muscle activation strength to capture a user's intent for opening or closing a hand. See Sears H H, Shaperman J., "*Proportional myoelectric hand control: an evaluation*," Am J Phys Med Rehabil. 1991 February, 70(1): 20-8; Kyberd P J, Chappell P H. "*The Southampton Hand: an intelligent myoelectric prosthesis*," JRRD, 1994 November, 31(4): 326-34; and Engeberg E D, Meek S., "*Improved grasp force sensitivity for prosthetic hands through force-derivative feedback*," Biomedical Engineering, IEEE Transactions on. IEEE, 2008, 55(2): 817-21. However, closing a hand around a rigid object may cause the motors driving the fingertips to stall when they can no longer advance, which can cause high stalling forces (around 50-100 N in prosthetics, and even higher with other robotic hands).

Fragile or compliant objects may therefore be challenging to grasp without damage or deformation because they may not be capable of resisting such forces. If the operator decides to pick up a fragile object, therefore, he or she may need to use a high level of visual attention to precisely time stopping the hand as it encloses on an object before it breaks. Such a task can be quite difficult with prosthetic hands due to delays in visual processing in the cortex (e.g., ~200 ms), filtering delays in EMG signals, and inertia and friction of motors. This can make timing a precise stopping of fingertips quite challenging.

Stopping too early, on the other hand, may not adequately grip the object (and thus may require additional closing commands). Stopping too late, on the other hand, may crush a fragile object. For prosthetic fingertips that are relatively stiff, there may be little room for forgiveness. As a result, myoelectric prosthetic hand users may avoid grasping these types of fragile objects with their prosthetic hands due to the time-consuming and intense focus that may be required. Surgeons performing telerobotic surgery, as well as other telerobotic operators, may experience similar challenges that may require substantial training and concentration to address.

In other robotic applications, servomotors or stepping motors may be used. But dexterous manipulation of fragile objects may be equally challenging for the same reasons.

A similar control problem may arise in preventing robot appendages from harming themselves or damaging external objects when collisions occur with or between appendages. These appendages may have hard surfaces. The impact force from a collision with a robotic actuator may increase with the hardness of the colliding surfaces and the relative speed of the robotic appendage and the object. By the time a collision is detected by detecting increased loading on actuators, significant damage may have already occurred.

In autonomous robotic applications, the ability to recognize contact may become even more challenging, with robots typically following a prescribed trajectory at full power and stopping only if the object offers substantially high enough resistance to stall the robotic actuators. Machine vision and ultrasonic proximity sensor approaches may help prevent unwanted collisions, but can be subject to high variability in accurately detecting an object before collision. Machine vision in particular can be subject to errors if the cameras become occluded or if lighting is poor. In applications where safety and reliability are of high concern, these technologies may therefore be less desirable.

For prosthetic and robotic fingers, there is a commercially-available product called a BioTac® in which contact is sensed by a pressure sensor connected to a liquid that is used to inflate an elastomeric skin over a rigid core. See U.S. Pat. Nos. 7,658,119, 7,878,075, 8,181,540, 8,401,658, and Fishel J A, Santos V J, Loeb G E. "*A robust micro-vibration sensor for biomimetic fingertips*," IEEE/BioRob. IEEE, 2008, pp. 659-63; Wettels N, Santos V J, Johansson R S, Loeb G E. "*Biomimetic tactile sensor array*," Adv. Robotics. 2008a, 22(7): 829-49; Wettels N, Smith L M, Santos V J, Loeb G E. "*Deformable skin design to enhance response of a biomimetic tactile sensor*," IEEE/BioRob. 2008b, pp. 132-7; Lin C H, Erickson T W, Fishel J A, (null), Wettels N, Loeb G E. "*Signal processing and fabrication of a biomimetic tactile sensor array with thermal, force and microvibration modalities*," IEEE/ROB10.2009, pp. 129-34; Wettels N, Loeb G E. "*Haptic feature extraction from a biomimetic tactile sensor: force, contact location and curvature*," IEEE/ROBIO. 2011, pp. 2471-8; Fishel J A, Loeb G E. "*Bayesian exploration for intelligent identification of textures*," Front. Neurorobot. 2012a, 6; Fishel J A, Loeb G E. "*Sensing tactile micro vibrations with the BioTac-Comparison with human sensitivity*," IEEE/BioRob. IEEE, 2012b, pp. 1122-7; Su Z, Fishel J A, Yamamoto T, Loeb G E. "*Use of tactile feedback to control exploratory movements to characterize object compliance*," Front. Neurorobot. 2012, 6; and Xu D, Loeb G E, Fishel J A. "*Tactile identification of objects using Bayesian exploration*," IEEE International Conference on Robotics and Automation. 2013. The device has a compliance similar to the human fingertip and can provide sensitivity that exceeds human performance. See Fishel J A, Loeb G E. "*Sensing tactile micro vibrations with the BioTac-Comparison with human sensitivity*," IEEE/BioRob. IEEE, 2012b, pp. 1122-7. However, the device has a complex electromechanical design and may require an electrically conductive and incompressible liquid, typically a form of saltwater. This may damage mechatronic components if it leaks from the sensor. Further, differences between the inertial properties of the liquid-filled fingertip and the ambient air may amplify vibration from motor actuation so as to create background noise in the pressure measurements. This may make it more challenging to discriminate between mechanical noise and actual contact. Thus, higher thresholds and larger contact forces may be required to produce a contact pressure that exceeds the noise. Additionally, the BioTac and other inflated sensors may require and result in a skin surface that is convex as a result of inflating an elastic skin with a fluid material. However, the shape of an appendage that requires tactile sensing may include complex and compound curves, including regions that are concave, regions that must be subdivided into separately sensed compartments, and regions that project over structures to protect them, but cannot attach to those structures without interfering with their motion. If the fluid inflating the elastic skin escapes, moreover, the skin may lose its desired shape and may collapse onto the underlying rigid structure, thereby losing compliant protection of that rigid structure.

Other tactile sensors have a fluid-filled cavity and/or pressure sensing. Shinoda et al. describe a device that uses air pressure created in carefully shaped channels within a deformable polymer that is conveyed to microphones used as pressure sensors; and differential signals from these multiple sensors are used to extract directional force and slip vibrations. See Shinoda H, Uehara M, Ando S. "*A tactile sensor using three-dimensional structure*," ICRA. IEEE, 1993, pp. 435-41. Ringwall and Case describe an array of air-filled channels that convey skin deformation via air pressure to deform a reflective metallic tab for optical detection. See Ringwall C G, Case A W Jr. "*Tactile sensor*," Company GE, editor. US Patent Office; 1981. Kim et al. describe an inflatable mouse with a pressure sensor to detect a mouse click. See Kim S, Kim H, Lee B, Nam T J, Lee W. "*Inflatable mouse: volume-adjustable mouse with air-pressure-sensitive input and haptic feedback*," CHI 2008. ACM, 2008, pp. 211-24. Dahley et al. describe an air-filled closed-cell elastomeric foam that is electrically conductive for detection of its deformation by contacting electrodes. See Dahley A, Su V, Magnussen B. "*Electronic whiteboard system using a tactile foam sensor*," Siemens Technology-to-Business Center LLC, Aktiengesellschaft S, editors, US Patent Office, 2002. Levin and Abramson describe an air-filled bumper with an electrical contact switch to detect collision. See Levin S, Abramson S. "*Tactile Sensor*," Friendly Robotics Ltd., editor, WO Patent 2,001,070,541, United States Patent Office, 2002. Ceres et al. describe a pneumatic suction cup for grasping fruit that incorporates a pressure sensor to identify when grasp has been achieved. See Ceres R, Pons J L, Jimenez A R, Martin J M, Calderon L. "*Design and implementation of an aided fruit-harvesting robot (Agribot)*," Industrial Robot: An International Journal, MCB UP Ltd, 1998, 25(5): 337-46.

Tactile sensors may detect a wide range of physical phenomena, including capacitive, optical, magnetic, inductive, resistive, piezoelectric, piezoresistive, and ultrasonic. See Nicholls H R, Lee M H. "*A survey of robot tactile sensing technology*," Intnl J Robotics Res. 1989, 8(3): 3-30; Howe R D. "*Tactile sensing and control of robotic manipulation*," Adv. Robotics. 1994, 8(3): 245-61; Lee M H, Nicholls H R. "*Tactile sensing for mechatronics—a state of the art survey*,", Mechatronics. 1999, 9:1-31; and Dahiya R S, Metta G, Valle M, Sandini G. "*Tactile sensing—from humans to humanoids*," IEEE Trans Robotics. 2010, 26(1): 1-20.

Some tactile sensing approaches have sensor arrays that do not offer much compliance and tend to be insensitive to contact forces applied between discrete tactile cells. Examples of these include the Takktile array (Takktile, LLC), RoboTouch (Pressure Profile Systems), Weiss Tactile Sensors (Weiss Robotics) and the RoboSkin project. Patterning these sensory cells over complex surface can be challenging and costly and may result in areas that are insensitive to contact at the areas where contact sensitivity becomes the most important, such as edges and joints.

SUMMARY

A compliant tactile sensor may include sponge-like material, a flexible skin, and a fluid pressure sensor. The flexible skin may have a shape, absorb fluid, compress in response to force applied to the sponge-like material, and decompress and return to its original shape when the force is removed. The flexible skin may cover an outer surface of the sponge-like material. The fluid pressure sensor may sense changes in pressure in fluid that is within the sponge-like material caused by a force applied to the flexible skin.

A fenestration may connect the sponge-like material to the fluid pressure sensor and may allow fluid to flow between the sponge-like material to the fluid pressure sensor.

The sponge-like material may be an open-cell foam.

The flexible skin may be made of the same material as the foam and may be integral to the sponge-like material.

The sponge-like material may be an engineered material that has a repeating pattern of cells.

The flexible skin may constitute a coating on the sponge-like material.

The flexible skin may be impermeable to the fluid.

The sponge-like material and the flexible skin may both be permeable to the fluid, but the permeability of the flexible skin to the fluid may be substantially less than the permeability of the sponge-like material to the fluid.

Fluid may be within the sponge-like material. The fluid may be a liquid or a gas.

The compliant tactile sensor may include a valve that, when open, allows fluid to flow between outside of the compliant tactile sensor and the sponge-like material.

The valve, when open, may only allow the fluid to flow in one direction.

The valve may allow fluid to flow into the sponge-like material from outside of the compliant tactile sensor only when the pressure of the fluid outside of the compliant tactile sensor exceeds the pressure of the fluid within the sponge-like material by a threshold amount.

The valve may allow fluid to flow outside of the compliant tactile sensor from within the sponge-like material only when the pressure of the fluid within the sponge-like material exceeds the pressure of the fluid outside of the compliant tactile sensor by a threshold amount.

There may be a second valve that, when open, only allows fluid to flow in a direction opposite of the direction that the first valve allows fluid to flow.

A robotic system may include a movable robotic arm, a compliant tactile sensor on the movable robotic arm that senses contact between the compliant tactile sensor and an object during movement of the movable robotic arm and that cushions the effect of that contact, and a reflex system that causes the moveable robotic arm to move in response to commands.

The robotic system may include multiple compliant tactile sensors on the movable robotic arm that each sense contact between the compliant tactile sensor and an object during movement of the movable robotic arm and that each cushion the effect of that contact.

The robotic system may include a flexible joint and the compliant tactile sensor may cover the flexible joint.

The robotic system may include a controller that generates the commands and determines whether the movable robotic arm has come in contact with an object during movement of the movable robotic arm based on one or more signals from the compliant tactile sensor.

The controller may determine a magnitude of contact force that is applied to the compliant tactile sensor by the object based on one or more signals from the compliant tactile sensor.

The controller may stop movement of the movable robotic arm in the direction of the object when the one or more signals from the compliant tactile sensor indicate contact between the compliant tactile sensor and an object during movement of the movable robotic arm.

The robotic system may include a tactor that provides tactile feedback of contact between the compliant tactile sensor and the object during movement of the movable robotic arm based on one or more signals from the compliant tactile sensor.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3A is an example of multiple compliant tactile sensors on a movable robotic arm that has a flexible joint; FIG. 3B is a cross-section of an example of multiple compliant tactile sensors on a movable robotic limb; and FIG. 3C is an example of multiple compliant tactile sensors covering a flexible joint in a movable robotic arm.

FIGS. 5A-5C illustrate an example of a force been applied to and then removed from two different types of compliant tactile sensors. FIG. 5A illustrates the force; FIG. 5B illustrates the responses from the sensors; and FIG. 5C illustrates a high-pass filtered version of the signals illustrated in FIG. 5B.

FIG. 7A illustrates velocity during collision and loss of contact with a movable robotic arm both with and without a compliant tactile sensors; FIG. 7B illustrates displacement; and FIG. 7C illustrates force.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Various compliant tactile sensors and associated robotic systems are now described. They may provide a sensitive yet robust means to sense contact between a robotic or prosthetic appendage and other objects. The design and electrical connections may be very simple. Contact surfaces on a robotic or prosthetic appendage may be compliant, rather than hard. There may be sensorized contact surfaces that have arbitrary shapes. The compliant tactile sensor may be produced in arbitrary shapes at low per-unit costs. The compliant tactile sensor may provide a high degree of sensitivity to detecting contact, while a low incidence of false-positive signals from inertial acceleration of the sensor. The compliant tactile sensor may provide high sensitivity to both the onset and offset of contact. The sensor may move between different environments (such as air and water) while maintaining sensitivity to contact. The compliant tactile sensor may be incorporated into a system that interprets data from the sensor to minimize collision forces and improve safety in the event of accidental collision. The compliant tactile sensor may be incorporated into a system that interprets data from it to facilitate robotic grasp of fragile objects. The robotic system may be low in cost and provide only limited accuracy in its movements, but employ tactile information to compensate for delays and errors in its commands. Such compliant tactile sensors and associated systems may alleviate or reduce cognitive burdens experienced by prosthetic hand users and other teleoperators when grasping fragile or compliant objects. Such sensors and system may be employed with prosthetic hand users and other teleoperators and facilitate conscious perception of sensory events.

Prosthetic limbs and parts thereof may be in the form of a robot. When directly controlled by the operator wearing them, they are considered to be a telerobot. Any portion of the robot that can move through space is an appendage or moveable arm of the robot and any portion of the surface of the appendage or movable arm may come into contact with external surfaces, tools and objects, with itself, with human beings (including the operator), and/or with other appendages of the same or a different robot. All of these are included in the concept of "object contact."

Figure 1:
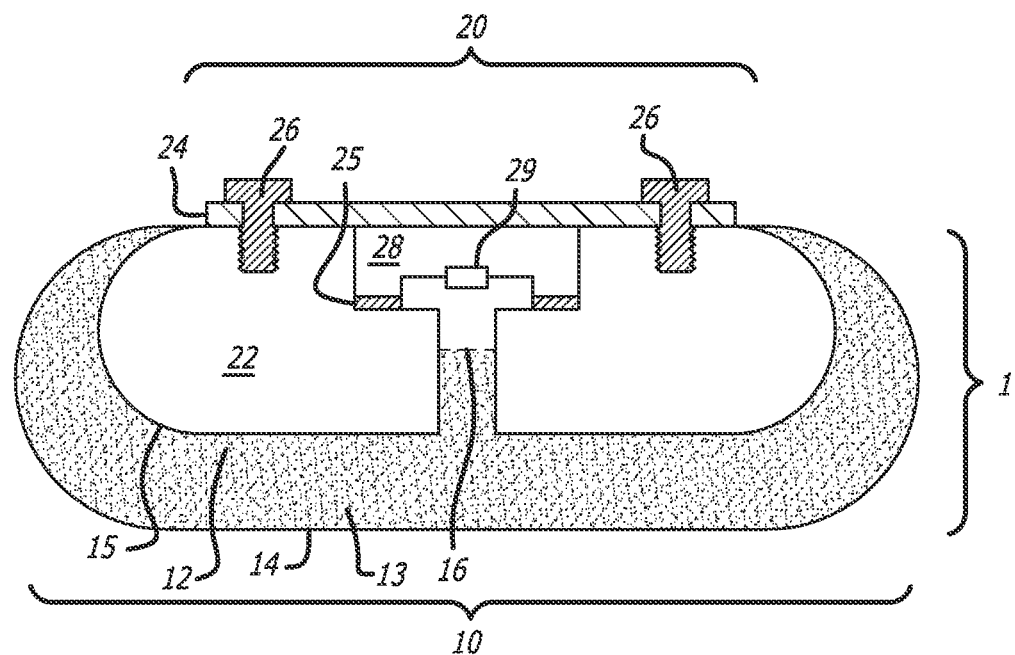
FIG. 1 illustrates an example of a compliant tactile sensor with ambient fluid, an elastomeric pad, and a sensor mount.

Referring to FIG. 1, a compliant tactile sensor 1 may include an elastomeric pad 10 and a sensor mount 20. The elastomeric pad 10 may include sponge-like material 12 containing fluid 13 surrounded by a flexible skin 14. The sponge-like material 12 may be bonded 15 to a rigid core 22, which may be part of the sensor mount 20. The sensor mount 20 may include a compression plate 24 which may push a pressure sensor housing 28 containing a pressure sensor 29 against a gasket 25 when tighteners 26 are installed and tightened, thereby forming a complete seal of fluid 13 in the elastomeric pad 10. Pressure, force or vibration applied anywhere on the outside of skin 14 may cause a change in fluid pressure to propagate through the fluid 13 and through a fenestration 16 in sponge-like material 12 into pressure sensor housing 28 where it may be sensed by the pressure sensor 29. The mechanical compliance of the elastomeric pad 10 may offer a cushioning from impact that can reduce impact force, while maintaining sensitivity to contact, as detected by the pressure sensor 29 when the flexible skin 14 is contacted.

A number of off-the-shelf technologies may be used for sensing pressure. They may incorporate both the pressure sensor housing 28 and the pressure sensor 29 in a single package. An example is the MS 1471 (Measurement Specialties), which is a low-cost, low-pressure, miniature gage pressure sensor based on MEMS (microelectromechanical systems) that provides analog millivolt output in response to applied pressure. Analog pressure sensors may facilitate custom signal processing; alternatively, off-the-shelf digital pressure sensors may provide a smaller form factor and a reduced cost.

The sponge-like material 12 may be an open-cell reticulated foam. The skin 14 may form spontaneously on the surfaces of the foam where it contacts an injection mold in which it is formed, as in the case of a self-skinning foam. The foam material for the elastomeric pad 10 may be of any type, such as polyurethane foam, polyester foam, polyether foam, or other polymers capable of being produced as open-cell reticulated foams. Alternatively, the flexible skin 14 can be produced over the sponge-like material 12 through spray coating, dip coating, or other means to create an airtight seal. The coating materials may be of any type, such as polyvinyl fluoride, polyurethane, or silicone elastomers. Alternatively, the mold may be lined with a sprayed-on or preformed skin 14 before injecting the foam material to form the sponge-like material 12 within it.

The fenestration 16 may be produced by puncturing or drilling the self-skinning foam used to produce the sponge-like material 12 and the skin 14.

The sponge-like material 12 may be produced with 3D printing that constructs an elastomeric matrix that can be of any variant of lattice shapes that are permeable to fluid, such as cubic or honeycomb. The sponge-like material 12 may be formed by fusing together elastic beads with heat or glue in such a manner as to leave inter-connected, fluid-permeable spaces between them.

The fluid 13 may be a liquid or a gas. The fluid 13 may be the same as fluid in the environment in which the sensor is operating. For example, when the sensor is used in air, the fluid 13 may be the air. When the sensor is used in water, the fluid 13 may be the water. The use of ambient fluid for the fluid 13 may mitigate any complications that otherwise might arise due to diffusion or leakage of fluid into the environment from the compliant tactile sensor or vice versa. The use of ambient fluid for the fluid 13 may minimize any mismatch between the inertial properties of the sensor and the ambient environment, thereby reducing the amplitude of vibrations that may be induced in the sensor not arising from contact with the skin 14.

The gasket 25 may be made of the same self-skinning foam used to produce the sponge-like material 12 and the skin 14. Alternatively, the gasket 25 may be an o-ring or similar molded rubber part, or any other type of gasket.

If there are small leaks in the skin 14 or the gasket 25, some air may be lost during prolonged increases in pressure arising from forceful contact with external objects. But that air may be replaced due to suction created by the spring-like properties of the elastomeric pad 10. Controlled leaks may be deliberately introduced into the tactile sensor to provide a high-pass filtering effect, so as to change the nature and sensitivity of the detected signals or prevent saturation of or damage to the pressure sensor 29, examples of which are described below in connection with the discussion of FIG. 5.

The rigid core 22 may be machined from a suitable material, such as plastic or metal, including aluminum, delrin, ABS plastic or similar, or injection molded, photo-polymerized, or laser sintered from a suitable precursor material. The surface of the core may be roughened by bead-blasting, chemical etching, or similar processes to improve the adhesion of the foam to the core, which can be molded directly over the core during production.

The tighteners 26 can be a screw or other similar fastener or, for injection-molded plastics, a snap-fitting. Alternatively, although not illustrated, the pressure sensor housing 28 may be permanently affixed over the fenestration 16 in the elastomeric pad 10 by means of an adhesive, such as epoxy, cyanoacrylate, or a chemical weld, such as by a solvent.

Figure 2:
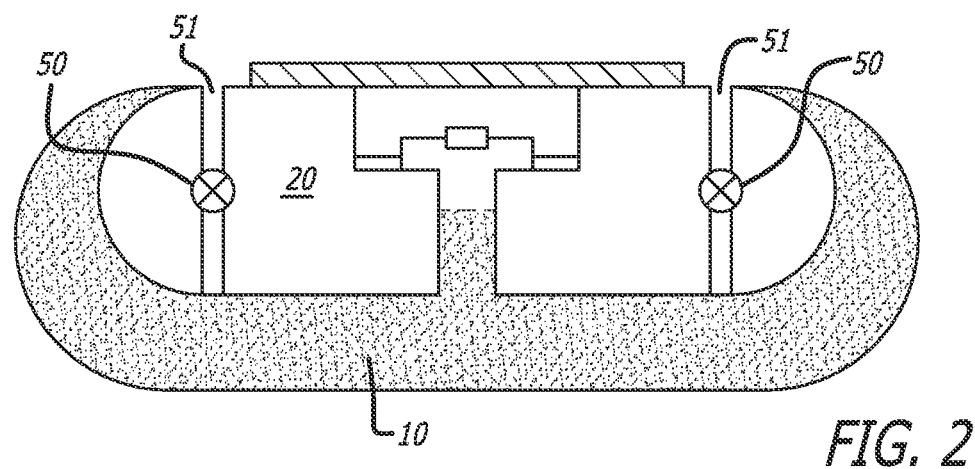
FIG. 2 illustrates an example of a compliant tactile sensor that has a check valve and vent for fluid.

Referring to FIG. 2, a modification can be made to the sensor to include one or more valves 50 in order to control the fluid pressure, exhaust, and/or refill the elastomeric pad 10, including unidirectional check valves, bidirectional check valves, and others. For example, a polymeric duckbill valve, such as the DU 027.001-150.01 from MiniValve, or similar check valve may be used. The valves 50 may be in line with vents 51 that access either fluid in the environment at ambient pressures or positively or negatively pressurize fluid. The use of either positive or negative pressured fluid connected to the vents 51 may permit for detection of leaks, if the skin 14 of the elastomeric pad 10 or the gasket 25 of the sensor mount 20 is ruptured or damaged.

Positively pressurized fluid may be used to inflate the sensor to a greater volume, improving the compressible distance of the elastomeric pad 10. If the sensor is fabricated or used in one environment (e.g. air) and moved to another environment (e.g. water), the valves 50 may be incorporated into the sensor so that fluid expressed from the sensor can be replaced by ambient fluid, which may be sucked in by negative pressure created by expansion of the sponge-like material 12. Alternatively, the internal fluid of the elastomeric pad 10 can be maintained by slow leaks or diffusion through the skin 14.

Figure 3A:
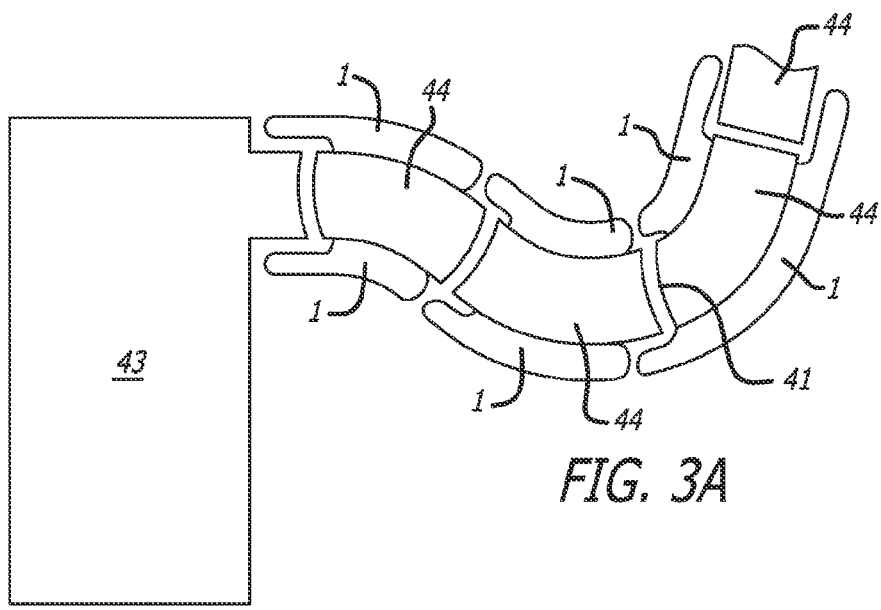
FIGS. 3A-3C illustrate examples of robotic systems that have multiple compliant tactile sensors deployed on movable robotic arms.

FIG. 3A illustrates a robot 40 consisting of a robot base 43 with one or more limb segments 44 linked by articulations 41 that are axially revolute joints. Multiple tactile sensors 1 may be attached to various locations on limb segments 44. The elastomeric pad 10 of at least some tactile sensors 1 may be shaped so as to protrude over articulations 41 without interfering with the motion of articulations 41.

Figure 3B:
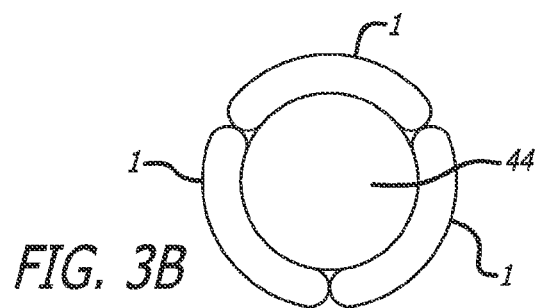

FIG. 3B is a cross-sectional view that illustrates the use of multiple tactile sensors 1 disposed over the surface of one limb segment 44, thereby providing spatial information about point of contact during collisions with external objects.

Figure 3C:
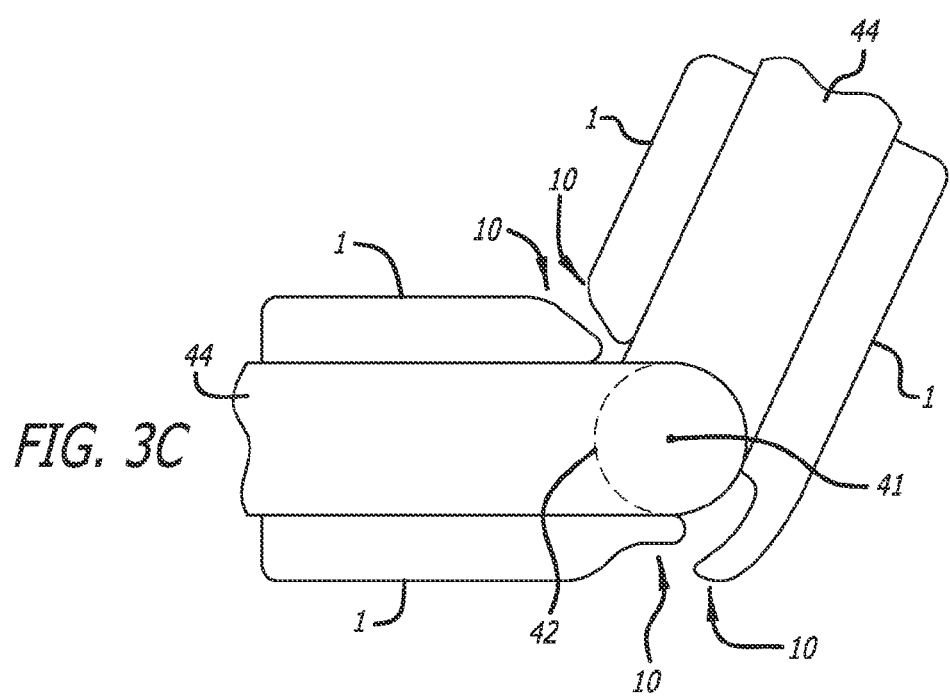

FIG. 3C illustrates robotic limb segments 44 connected by hinge-like articulation 41 in which multiple tactile sensors 1 have elastomeric pads 10 shaped so as to maintain coverage over articulation 41, while avoiding contact between elastomeric pads 10 as limb segments 44 change relative position during motion of articulation 41.

The timing, time-course, amplitude, frequency spectrum, and/or other features of signals detected by and transmitted from the pressure sensor 29 may be combined with information about the movements of the robot to command changes in its movements or to aid in the localization or identification of external objects. Examples are provided in the following publications: Su Z, Fishel J A, Yamamoto T, Loeb G E. "*Use of tactile feedback to control exploratory movements to characterize object compliance*," Front. Neurorobot. 2012, 6; Fishel J A, Loeb G E. "*Bayesian exploration for intelligent identification of textures*," Front. Neurorobot. 2012a, 6; Matulevich B, Pandit V, Lin C H, Loeb G E, Fishel J A. "*Utility of contact detection and compliant fingertips in prosthetic hand control*," Review. 2013; Xu D, Loeb G E, Fishel J A. "*Tactile identification of objects using Bayesian exploration*," IEEE International Conference on Robotics and Automation, 2013.

Figure 4:
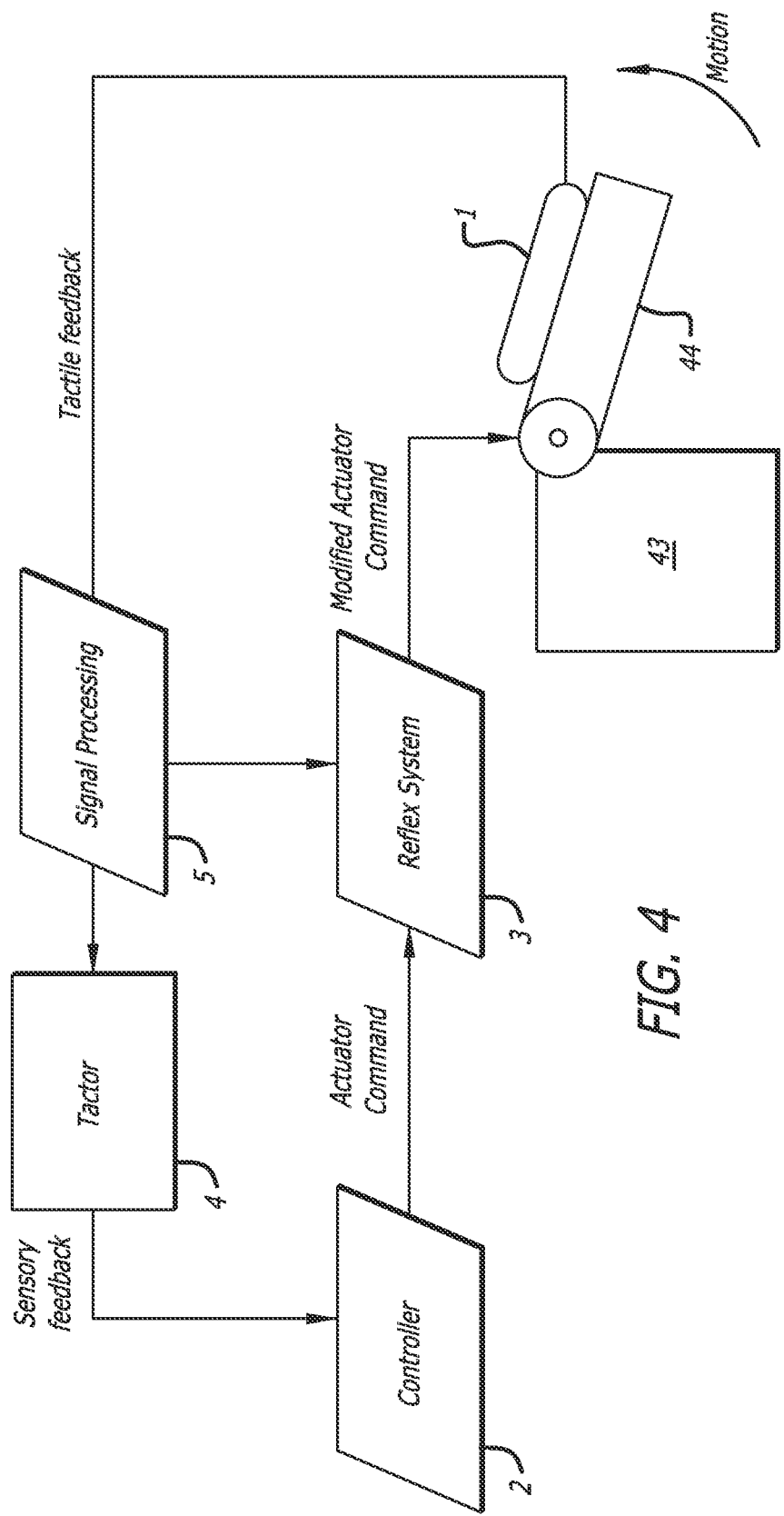
FIG. 4 is an example of a robotic system that may include a movable robotic arm, a compliant tactile sensor, and various subsystems.

FIG. 4 is an example of a generic control system making use of sensory information from tactile sensors 1 mounted on a robot 40. A controller 2 may be a computer running software autonomously, or a human operator controlling a telerobotic system or prosthetic hand that sends motor commands to a reflex system 3, which may modify the motor commands going to one or more robotic actuators 42. Reflex system 3 may be composed any type of signal processing electronics and firmware designed to receive and process electrical signals from the controller 2 intended to drive the one or more robotic actuators 42 that may or may not modify these electrical signals to one or more of the robotic actuators 42, based on sensory information measured from one or more of the tactile sensors 1. Alternatively, the function of the controller 2 and the reflex system 3 could be integrated into a single piece of hardware. The robotic actuators 42 could be any type of actuator capable of changing the position of or applying torque or force through articulation 41, including a direct drive electrical, pneumatic or hydraulic motor, a gear or cable mechanical linkage, or any other type. Information obtained from the tactile sensors 1 mounted on any of the limb segments 44 of the robot 40 can be processed by a signal processor 6 and delivered to the reflex system 3 to modify the motor commands delivered from the controller 2 to the actuators 42 of the robot 40 to produce useful functions as described below.

Algorithms embodying such reflexive behaviors may mimic biological reflexes in the spinal cord, which may be modulated by descending commands from the brain to achieve useful functions for humans to enable stable grasp and protect the human body from damage. In the case of autonomous robots, movement commands may originate from autonomous software and, in the case of telerobotics movement, commands may originate from a human operator.

Signal processing in the reflex system 3 may utilize analog electronic circuitry to modify high power signals that drive the motors to move robotic actuators. Alternatively, reflex system 3 can be directly integrated into higher-level analog or digital systems to modify command signals before they are amplified to the higher-power signals typically used to drive electric actuators.

Information derived from ambient fluid pressure can also be provided directly to an operator of a telerobot. For example, mechatronic devices known as tactors 4 can generate force and vibration proportional to the signals detected by the tactile sensor 1. Tactors can be worn on the body or appendages or included inside a socket of a prosthetic limb to deliver these stimuli. One embodiment for force tactors may be low-profile linear actuators or solenoids that press into the operators skin at greater depth as forces are increased. One embodiment for vibration tactors may be low-cost vibrators, such as employed in mobile telephones, that increase the amplitude and/or frequency of vibration in proportion to the applied voltage. Other methods for conveying tactile feedback, such as direct electrical stimulation of the nervous system, visual displays, and audible sounds, may be used in addition or instead.

Referring to FIGS. 1 and 4, electronic signals from the pressure sensor 29 can be conditioned and transmitted by conventional electronic circuitry and processed by the reflex system 3 of the robot 40 on which the tactile sensor 1 may be installed. Sensor electronics inside the tactile sensor 1 can be programmed to perform some or all of the desired control functions of the reflex system 3 locally. The reflex system 3 can be directly integrated into the compression plate 24, which itself may be an electronics board.

In addition to determining contact per se, the signals from the pressure sensor 28 can be processed so as to reveal other useful information. If the fluid 13 is well-sealed into the tactile sensor, the steady-state pressure provides a useful indication of the contact force between fingertips and objects. Small, high frequency fluctuations in the fluid pressure may be indicative of vibrations in the skin that tend to arise when the fingertips slide over surfaces and can be used to infer the texture of the surface and to identify such slippage. For example, vibration power can be determined by computing the power of filtered pressure signals within a bandwidth, such as 10-500 Hz, using analog or digital signal processing methods, such as those described by Fishel J A, Loeb G E. "*Bayesian exploration for intelligent identification of textures*," Front. Neurorobot, 2012a, 6; and Fishel J A, Loeb G E. "*Sensing tactile micro vibrations with the BioTac-Comparison with human sensitivity*," IEEE/BioRob. IEEE, 2012b, pp. 1122-7. The amplitude and timing of such vibration signals may be an indicator of incipient and actual slippage, impacts, coefficient of friction, and textural properties of surfaces.

Two or more tactile sensors 1 may be positioned so as to make simultaneous contact with the same object. Time-varying signals from them can be cross-correlated to distinguish impact of a grasped object with another object from slip between the robotic gripper and the grasped object. See Heyneman B, Cutkosky M R. "*Biologically inspired tactile classification of object-hand and object-world interactions,*"

2012, pp. 167-73. All of this information derived from the fluid pressure may be used as feedback to the controller to cause automatic adjustments to the drive signals provided to the actuators 42. Such feedback control is described in publications cited herein, particularly as applied to adjustment of grip force. Other control schemes utilizing tactile feedback may be used in addition or instead.

The mechanical properties of the skin 14 can be optimized to obtain either sustained response to constant pressure or sensitivity, as illustrated in FIGS. 5A-5C. Making skin 14 thicker and/or in multiple layers can reduce the leaking of the fluid 13, but may increase the rigidity and therefore reduce the sensitivity and compliance of the device.

FIGS. 5B-5C illustrate an example of the response of two variants of skin 14: traces A are signals from an airtight tactile sensor 1, and traces B are from a tactile sensor 1 with a leaky skin 14. The leaky skin 14 acts may act like a high pass filter, producing transient positive and negative signals at the onset and offset of contact, respectively. Absolute force could be recovered by taking the integral of the signal, but this may result in errors due to drift.

Figure 6:
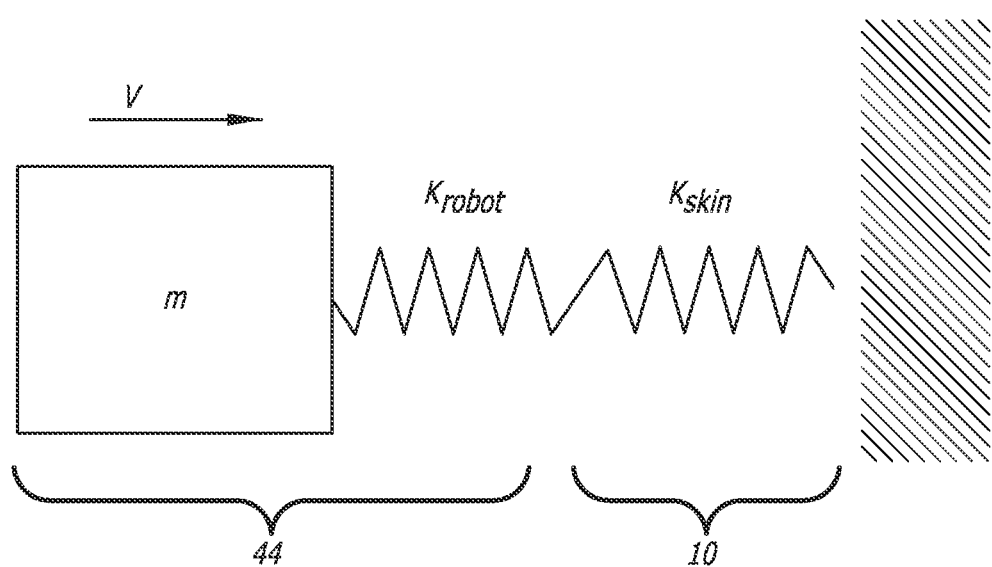
FIG. 6 illustrates an example of a rigid object colliding with movable robotic arm, both with and without an elastic skin covering.

FIGS. 6 and 7A-7C provide an example of how contact sensitivity and compliant sensors can be used to reduce contact forces. FIG. 6 is an example of a model of a robot limb segment 44 consisting of an equivalent mass m plus stiffness Krobot, and elastomeric pad 10 with stiffness Kskin, colliding with a rigid object at initial velocity v.

Figure 7A:
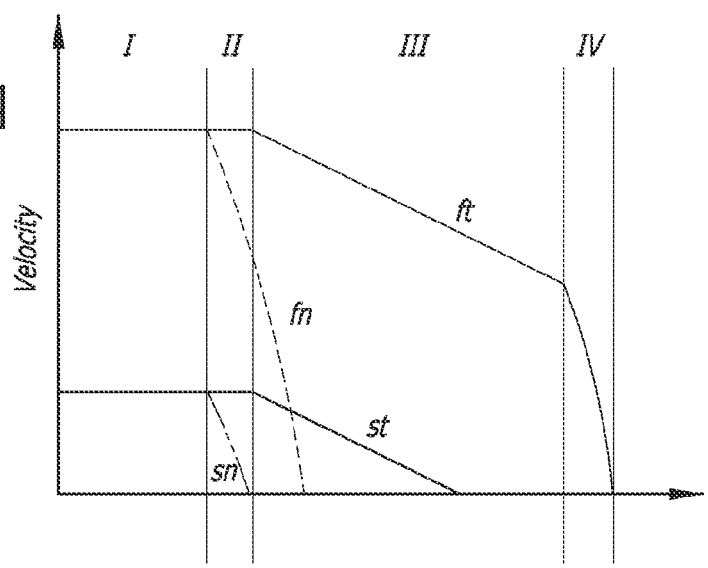
FIGS. 7A-7C illustrate an example of how a compliant tactile sensor can mitigate contact forces.
Figure 7B:
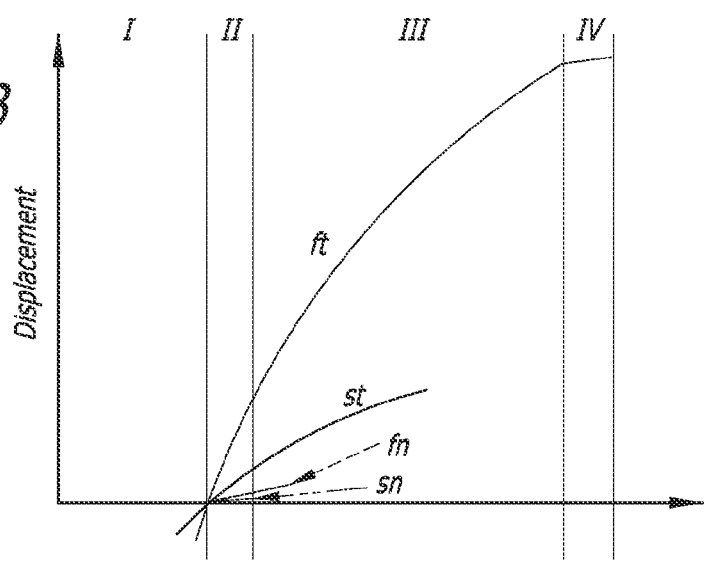
Figure 7C:
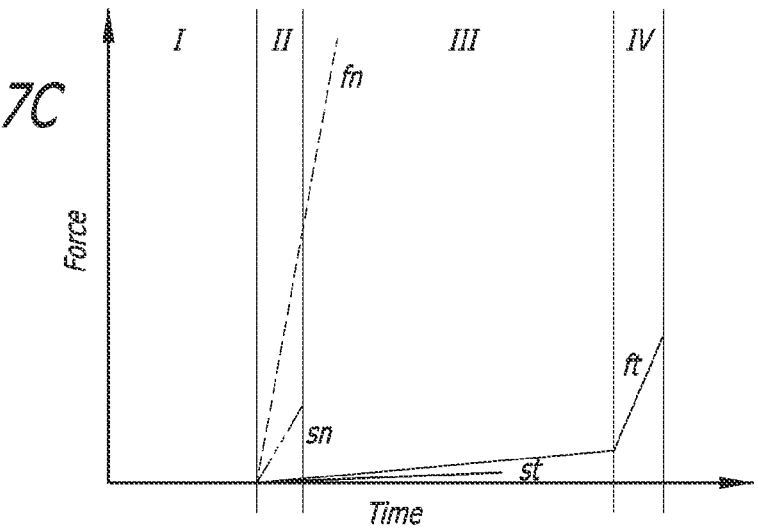
Figure 8:
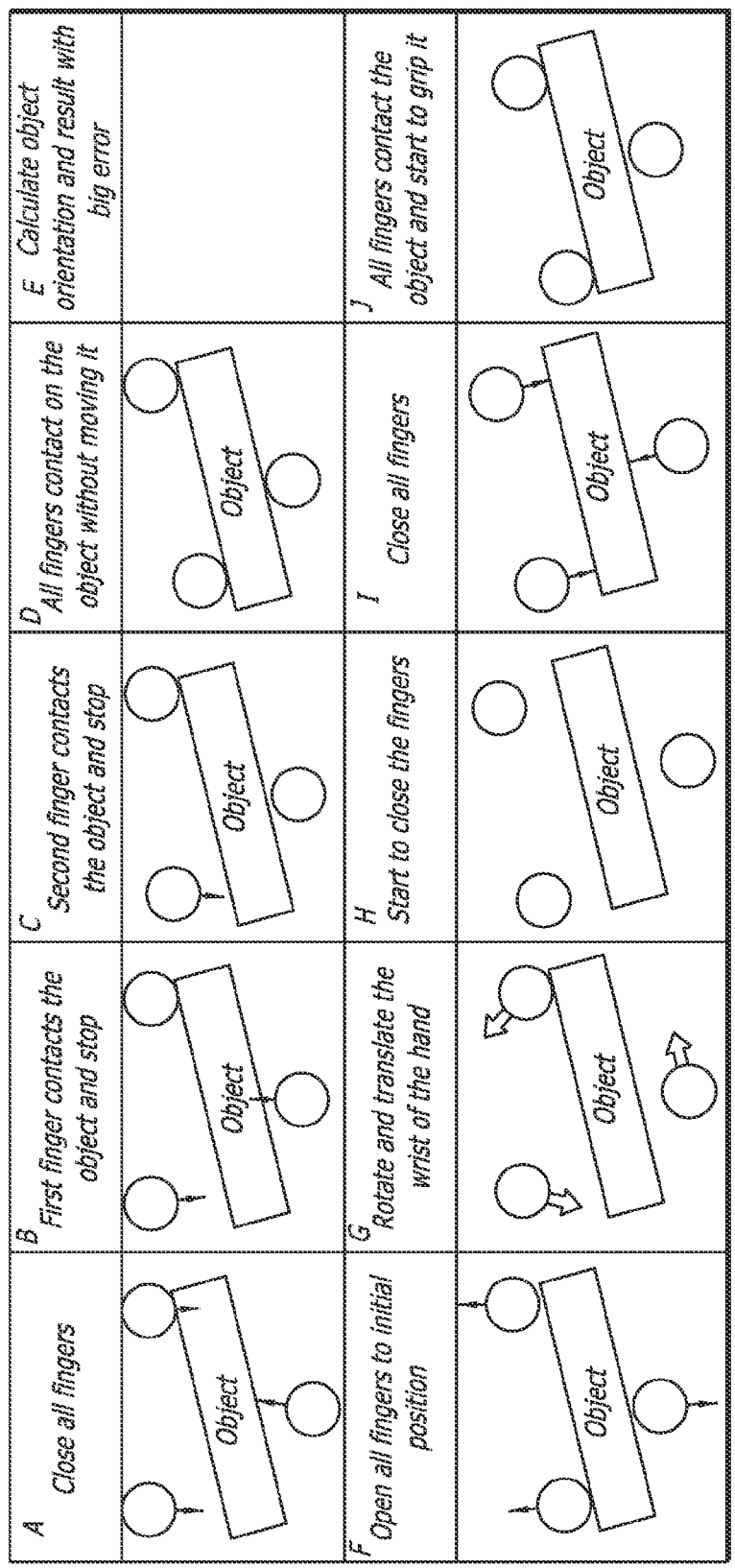
FIG. 8 is an example of orientation adjustments that may be made to a movable robotic arm that has multiple compliant tactile sensors.

FIG. 7A is the velocity of the robot limb segment 44 vs. time during the collision and loss of contact, FIG. 7B is the displacement of the robot limb segment 44 vs. time during the collision and loss of contact. FIG. 7C is the force exerted by the robot limb segment 44 vs. time during the collision and loss of contact. Four simulations are provided: a high-velocity collision with no tactile sensor (fn), a high-velocity collision equipped with a tactile sensor and reflexive ability to stop the robot once collision is detected (ft), a low-velocity collision with no tactile sensor (sn), and a low-velocity collision equipped with a tactile sensor and reflexive ability to stop the robot once a collision is detected (st). Region I represents the time before collision, with collision occurring at the end of region I. As exampled by the simulation, a robot limb segment 44 without compliant tactile sensors (cases fn and sn) quickly decelerates on impact due to the high stiffness of the robot limb segment 44 colliding with a rigid object, rapidly producing large collision forces that scale proportionally with increased initial velocity. By equipping robot limb segments 44 with compliant tactile sensors 1, collision can be detected, allowing for robotic actuator 42 to safely decelerate the robot limb segment 44 as the elastomeric pad 10 absorbs energy, thereby greatly reducing collision forces.

Referring again to FIG. 4, this can be embodied by permitting the reflex system 3 to identify when contact with tactile sensors 1 has occurred to modify the motor commands to the robotic actuators 42, causing them to brake or reverse the motion of limb segments 44.

Referring again to FIGS. 7A-7C, as exampled by the simulation, a robot limb segment 44 with such tactile sensors 1 and a reflex system 3 (cases ft and st) permit for safe deceleration and reduced contact forces. For these two simulations (ft and st), region II defines the response time of the reflex system 3 and robotic actuator 42 to begin deceleration once contact of the elastomeric pad 10 of the tactile sensor 1 attached to robot limb segment 44 is detected. During this period, the elastomeric pad 10 may begin compressing; however, the robotic actuators 42 may not yet have begun decelerating the robot limb segment 44. Region III defines the period in which the robotic actuator 42 has begun decelerating the robot limb segment 44 and the elastomeric pad 10 is compressing. For a low-velocity collision (such as case st), the robotic actuator 42 may safely stop the robot limb segment 44 without producing high forces. For high-velocity collisions in which the robot limb segment 44 is moving too quickly to be stopped by robotic actuator 42 before the elastomeric pad 10 is completely compressed, region IV defines the period in which the elastomeric pad 10 is completely compressed, and the stiffness of the robot limb segment 44 may dominate the collision forces, rapidly decelerating the motion and producing a rapid increase in force (as in cases fn and sn). However, having already decelerated the robot limb segment 44 velocity over region III, the net collision force may be substantially reduced.

A thicker elastomeric pad 10 may be used to increase the amount of time before such a collision in which the physics are dominated by the stiffness of the robot limb segment 44. The maximum velocity of the robot limb segments 44 can be limited by the controller 2 and/or the reflex system 3 to prevent such high velocities that cannot be stopped safely from ever occurring.

Information on the contact state can be used to provide a fragile grasp for both autonomous robotics and prosthetic hands. As described in Matulevich B, Pandit V, Lin C H, Loeb G E, Fishel J A. "*Utility of contact detection and compliant fingertips in prosthetic hand control*," Review, 2013. Utility of contact detection and compliant fingertips in prosthetic hand control, IEEE/RSJ International Conference on Intelligent Robots and Systems (IROS), Nov. 3-8, 2013, Tokyo, Japan, contact information from tactile sensors 1 can be used to modulate the control signals driving the robotic actuators 42 by producing an inhibitory reflex in the reflex system 3. Specifically, the relationship between the command input from the user and the actual voltage of the control signal(s) transmitted to actuator(s) 42 can be described as a gain. Upon detecting contact between one or more tactile sensors and an object to be grasped, this gain can be reduced. If actuator 42 is a DC motor or similar design, the sudden decrease in its control signal may result in actuator 42 stopping its motion when its torque reaches the stalling torque for the new value of the control signal, which torque may reflect the sum of frictional forces internal to its torque transmission linkage plus external force applied to the grasped object. The command to actuators 42 of a robotic hand can originate from autonomous software control, from a telerobotic master who could be operating a controller, or from a prosthesis user controlling a prosthetic hand using a conventional myoelectric control as described in the above-cited reference Matulevich et al., 2013. When contact is detected by opposing tactile sensors 1 in a prosthetic hand, telerobotic system or an autonomous robot, a reflex system 3 can automatically reduce the command to one or more actuators 42 by a fixed gain, permitting for automatic proportional control of stalling force regardless of when contact is made. Reducing the gain through the reflex system 3, rather than setting the gain to zero or reversing it, may permit the controller 2 to produce larger forces if desired by simply sending larger commands to the actuators 42. Such an approach may permit the controller 2 to maintain control over the behavior of the robot 40 and its actuators 42 while taking advantage of collision-mitigating reflexes. The use of a short delay (either naturally occurring or deliberately added to the control loop) in this reflexive behavior when contact is detected may also permit the controller 2 to have more precise control over stopping force as described below.

Larger command signals to actuators 42 may produce higher velocities of articulations 41, which may then move a greater distance before the reflexive behavior is enabled, thereby compressing compliant elastomeric pad 10 and storing elastic energy therein. Such an approach may result in both improved performance and consistency when grasping fragile objects with a prosthetic hand or telerobotic system where precise controlling of actuator 42 command signals from the controller 2 become difficult to synchronize with contact events, similar to an intact human hand that benefits from similar reflexes generated by the spinal cord.

FIGS. 8A-8D depict how contact sensitivity can be used to intelligently adjust for misalignment in a robotic grasp. As individual fingers each equipped with one or more tactile sensor 1 close on an object, each finger can be stopped when contact is made, permitting for delicate grasp that does not move the object, which could cause it to become unstable and potentially tip over. Alternatively, referring to FIG. 8E, the recognized grasp orientation may be undesirable, as detected by position or force sensors in the articulations and/or actuators of the hand when all of the fingers are stopped, as exampled in FIG. 8F-J. In this case, the grasper can make use of the information to reorient the grasper to a more preferred location and to re-grasp the object. Alternatively, the grasping orientation can be dynamically modulated to center the object between fingertips as the hand is closing. The tactile sensors 1 may be used on robotic grippers that are equipped with larger numbers of independently positionable contact surfaces that enable more complex repositioning of objects within the gripper by sequentially lifting, moving and placing at least one such contact surface while others are maintained in contact with the object.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A compliant tactile sensor comprising:
   sponge-like material that has a shape, that can absorb a gas, that compresses in response to force applied to the sponge-like material, and that decompresses and returns to its original shape when the force is removed;
   a flexible skin covering an outer surface of the sponge-like material; and
   a gas pressure sensor that senses changes in pressure in gas that is within the sponge-like material caused by a force applied to the flexible skin, wherein:
   the compliant tactile sensor includes a core that is partially surrounded by the flexible skin, and the sponge-like material occupies substantially the entire space between the flexible skin and the core at all times during use of the tactile sensor; or
   the sponge-like material and the flexible skin are both permeable to the gas, but the permeability of the flexible skin to the gas is substantially less than the permeability of the sponge-like material to the gas.

2. The compliant tactile sensor of claim 1 further comprising a fenestration that connects the sponge-like material to the gas pressure sensor and allows gas to flow between the sponge-like material and the gas pressure sensor.

3. The compliant tactile sensor of claim 1 wherein the sponge-like material is an open-cell foam.

4. The compliant tactile sensor of claim 3 wherein the flexible skin is made of the same material as the foam and is integral to the sponge-like material.

5. The compliant tactile sensor of claim 1 wherein the sponge-like material is an engineered material that has a repeating pattern of cells.

6. The compliant tactile sensor of claim 1 wherein the flexible skin constitutes a coating on the sponge-like material.

7. The compliant tactile sensor of claim 1 wherein the flexible skin is impermeable to the gas.

8. The compliant tactile sensor of claim 1 wherein the sponge-like material and the flexible skin are both permeable to the gas, but wherein the permeability of the flexible skin to the gas is substantially less than the permeability of the sponge-like material to the gas.

9. The compliant tactile sensor of claim 1 further comprising gas within the sponge-like material.

10. The compliant tactile sensor of claim 1 further comprising a valve that, when open, allows gas to flow between outside of the compliant tactile sensor and the sponge-like material.

11. The compliant tactile sensor of claim 10 wherein the valve, when open, only allows the gas to flow in one direction.

12. The compliant tactile sensor of claim 11 wherein the valve allows gas to flow into the sponge-like material from outside of the compliant tactile sensor only when the pressure of the gas outside of the compliant tactile sensor exceeds the pressure of the gas within the sponge-like material by a threshold amount.

13. The compliant tactile sensor of claim 11 wherein the valve allows gas to flow outside of the compliant tactile sensor from within the sponge-like material only when the pressure of the gas within the sponge-like material exceeds the pressure of the gas outside of the compliant tactile sensor by a threshold amount.

14. The compliant tactile sensor of claim 13 wherein the valve is a first valve and further comprising a second valve that, when open, only allows gas to flow in a direction opposite of the direction that the first valve allows gas to flow.

15. A robotic system comprising:
a robotic arm having movable segments;
a compliant tactile sensor that covers at least a portion of at least one of the movable segments, that senses contact between the compliant tactile sensor and an object during movement of the at least one movable segment, and that cushions the effect of that contact, the compliant tactile sensor including:
gas-filled foam that compresses when force is applied to the at least one movable segment and that returns to its original shape when the force is removed; and
a gas pressure sensor that senses changes in pressure in the gas within the foam caused by the force when applied to the at least one movable segment;
a reflex system that causes the moveable robotic arm to move in response to commands; and
a controller that:
generates commands to the robotic arm and determines whether the at least one movable segment on the robotic arm has come in contact with an object during movement of the at least one movable segment based on one or more signals from the compliant tactile sensor; and
generates commands to decelerate movement of the at least one movable segment in the direction of the object when the one or more signals from the compliant tactile sensor indicate contact between the compliant tactile sensor and an object during movement of the at least one movable segment.

16. The robotic system of claim 15 further comprising multiple compliant tactile sensors on the movable segments that each sense contact between the compliant tactile sensor and an object during movement of the movable segments arm and that each cushion the effect of that contact.

17. The robotic system of claim 15 wherein the controller determines a magnitude of contact force that is applied to the compliant tactile sensor by the object based on one or more signals from the compliant tactile sensor.

18. The robotic system of claim 15 further comprising a tactor that provides tactile feedback of contact between the compliant tactile sensor and the object during movement of the at least one movable segment robotic based on one or more signals from the compliant tactile sensor.

19. The robotic system of claim 15 wherein the compliant tactile sensor is of the type recited in claim 1.

20. The compliant tactile sensor of claim 1 wherein the compliant tactile sensor includes a core that is partially surrounded by the flexible skin and the sponge-like material has an internal surface that is bonded to the core.

21. The compliant tactile sensor of claim 1 wherein the compliant tactile sensor includes a core that is partially surrounded by the flexible skin and the sponge-like material occupies substantially the entire space between the flexible skin and the core.

22. The compliant tactile sensor of claim 1 wherein the gas has a positive or negative pressure.

23. The robotic system of claim 15 wherein controller stops the movement of the at least one movable segment when contact with the object is indicated before the gas-filled foam completely compresses.

24. The robotic system of claim 15 wherein:
two of the movable segments are connected by a joint; and
a portion of the compliant tactile sensor extends over the joint.

* * * * *